(12) United States Patent
Moutinho

(10) Patent No.: US 7,611,654 B2
(45) Date of Patent: Nov. 3, 2009

(54) PROCESS FOR PREPARING A CEMENT THREAD REPAIRING COMPOSITION

(76) Inventor: Antonio Sergio Moutinho, Alameda Franca, 37, Alphaville, Barueri (BR)

( * ) Notice: Subject to any disclaimer, the term of this patent is extended or adjusted under 35 U.S.C. 154(b) by 848 days.

(21) Appl. No.: 10/891,213

(22) Filed: Jul. 14, 2004

(65) Prior Publication Data

US 2005/0014880 A1 Jan. 20, 2005

(30) Foreign Application Priority Data

Jul. 18, 2003 (BR) .................................. 0303162

(51) Int. Cl.
*B28B 19/00* (2006.01)
(52) U.S. Cl. ................... 264/333; 264/331.18
(58) Field of Classification Search .............. None
See application file for complete search history.

(56) References Cited

U.S. PATENT DOCUMENTS

| | | | | |
|---|---|---|---|---|
| 4,130,442 A | * | 12/1978 | Petersen et al. | 134/4 |
| 4,238,542 A | * | 12/1980 | Burley | 428/58 |
| 4,507,424 A | * | 3/1985 | Webster | 524/442 |
| 5,543,178 A | * | 8/1996 | Smith | 427/299 |
| 6,698,961 B2 | * | 3/2004 | Pollock | 401/289 |
| 7,128,490 B2 | * | 10/2006 | McEwan | 401/140 |

* cited by examiner

*Primary Examiner*—Edmund H. Lee
(74) *Attorney, Agent, or Firm*—McKee, Voorhees & Sease, P.L.C.

(57) ABSTRACT

"PROCESS FOR OBTAINING CEMENT THREAD REPAIRER, CEMENT THREAD REPAIRER AND MANNER OF APPLICATION OF CEMENT THREAD REPAIRER", particularly of a process a process for obtaining a colored liquid film used for aesthetic recovery of cement threads between ceramic parts and/or stones. It offers the advantages of being usable in packages of practical application, having high yield, and waterproofing the area that received the application.

1 Claim, 1 Drawing Sheet

PROCESS FOR PREPARING A CEMENT THREAD REPAIRING COMPOSITION

Figure 1:
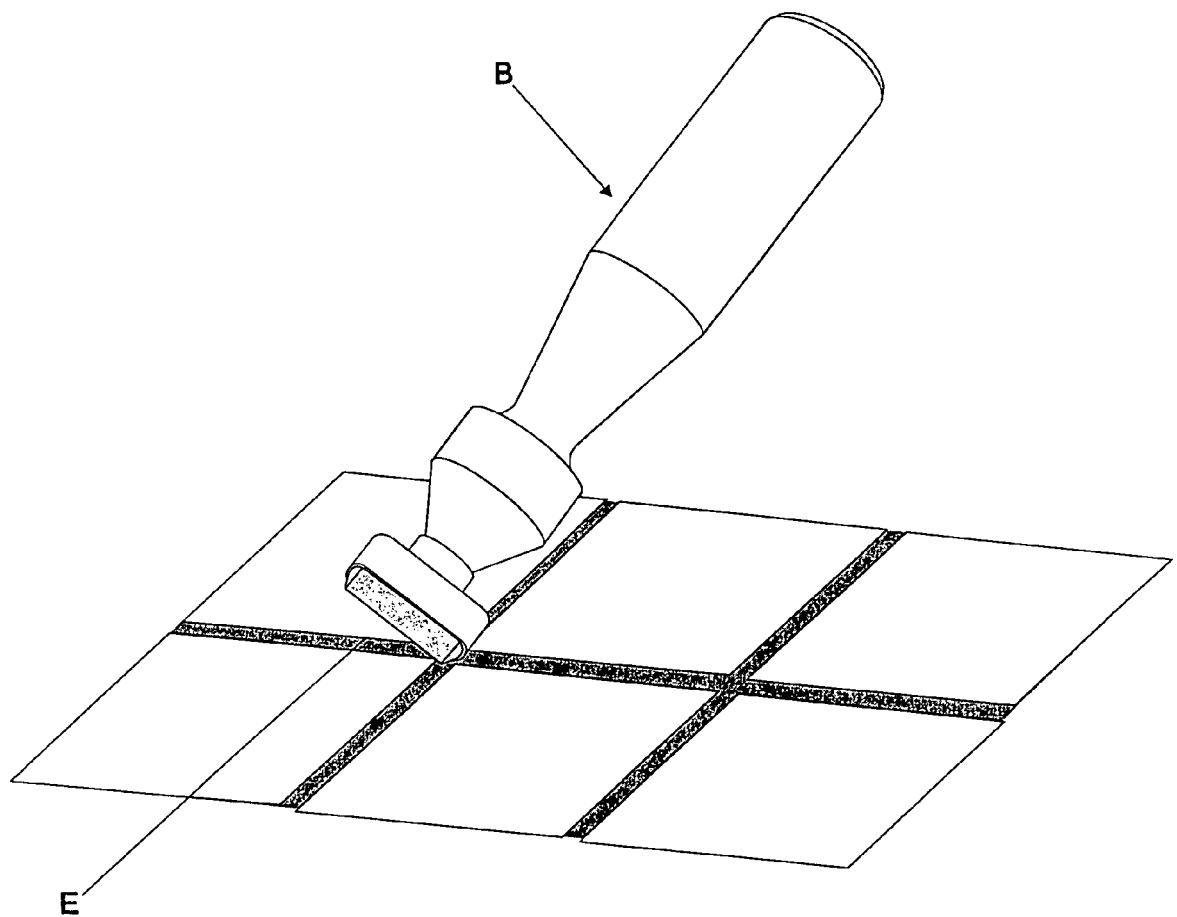

This invention patent application concerns a new "PROCESS FOR OBTAINING CEMENT THREAD REPAIRER, CEMENT THREAD REPAIRER AND MANNER OF APPLICATION OF CEMENT THREAD REPAIRER", particularly a process for obtaining a colored liquid film used to recover the original color or change the color of cement-based threads between ceramic and/or stone parts. The method of application includes a kind of squeeze tube with a foam tip specifically for applying the product on the placement joints.

Its advantages are, besides conferring a beautiful finish, the fact that it can be used in packages that allow its application with great ease; the possibility of choosing from a variety of more than 30 colors; and of waterproofing the area where the product was applied.

In the current STATE OF THE TECHNIQUE, there is no process or product for recovery or renewal of the aesthetic appearance of cement threads. The user must therefore remove the thread to make a new application, with the disadvantages of longer time required for this operation and the annoyance due to the messiness, increasing the cost-benefit ratio. Currently the thread is removed almost in a mechanical fashion, since there is no solution available in the market for renewal of the colors.

The invention is, specifically, a process a process for obtaining a colored liquid film used to recover the original color or change the color of cement-based threads between ceramic and/or stone parts.

The basic composition of the invention product is:
- Styrenated acrylic emulsion
- Inert minerals
- Inorganic pigments
- Alyphatic hydrocarbons
- Glycols
- Etoxylated and carboxylated tenso-active substances The product's composition allows it to be washed in neutral soap and water, with the advantage of being usable in packages of practical application, and have a high application performance.

The invention will be explained more clearly through the drawings listed below:

FIG. 1: Drawing in perspective showing the invention product in its manner of application.

The "PROCESS FOR OBTAINING CEMENT THREAD REPAIRER, CEMENT THREAD REPAIRER AND MANNER OF APPLICATION OF CEMENT THREAD REPAIRER" is a process for obtaining a colored liquid film used for aesthetic recovery of cement threads between ceramic parts and/or stones, in internal as well as external areas. Due to the wide range of colors offered, the product allows recovery of the original color, or at least close to it, and the application of colors different from the original one, with the purpose of changing the decoration of the surroundings.

The components must be mixed in a rotating mixer with power adequate for the production. After the above equipment is turned on, the following raw materials must be added, respecting the limits of concentration:
- Drinking water (27%-32%)
- Ammoniac solution (0.05%-0.10%)
- Dispersant (0.28%-0.38%)
- Tripolyphosphate solution (0.30%-0.60%)
- Precipitated calcium carbonate (16%-18%)
- Calcium carbonate (16%-17.5%)
- Titanium dioxide (10%-20%)

The above components must be mixed at room temperature for approximately 40 minutes. The mixer is then turned off for the addition of one more components:
- Styrenated acrylic resin After which the mixer is again turned on and the following raw materials are added:
- Coalescent (2% -4%)
- Fungicide (0.10%-0.20%)
- Bactericide (0.10%-0.20%)

The mixer should maintain the mixture at room temperature for approximately 10 minutes. Pigmentation will be carried out in a final stage, logically with the mixer operating to obtain a homogeneous distribution throughout the product.

The cement thread repairer, in its final state, is a liquid, colored product, specifically for aesthetic recovery of the threads, and may be used in colors close to those of the threads to be repaired or in different colors, to change the decoration of the surroundings.

The product's final composition includes styrenated acrylic emulsion, inert minerals, inorganic pigments, aliphatic hydrocarbons, glycols and etoxylated and carboxylated tenso-active substances.

In the method of application, the product, stored in a plastic squeeze tube (B), is applied directly on placement joints, between the parts, by squeezing the tube and sliding the foam (E) over the receiving surface.

The invention claimed is:

1. A process for preparing a cement thread repairing composition comprising:
   combining within a rotating mixer: drinking water, ammoniac solution, dispersant, tripolyphosphate solution, precipitated calcium carbonate, calcium carbonate, and titanium dioxide to form a first solution;
   mixing the first solution at room temperature within the rotating mixer for approximately 40 minutes;
   after mixing the first solution, adding styrenated acrylic resin to the first solution within the mixer while the mixer is turned off;
   adding coalescent, fungicide, and bactericide to first solution and styrenated acrylic resin within the mixer while rotating the mixer and maintaining the contents of the mixer at room temperature for approximately 10 minutes to create the cement thread repairing composition;
   adding pigmentation to the thread repair composition while rotating the mixer to obtain homogenous distribution of the pigmentation throughout the thread repair composition; and
   wherein the thread repair composition includes components having the following concentration ranges:
   drinking water 27-32%
   ammoniac solution 0.5-0.10%
   dispersant 0.28-0.38%
   tripolyphosphate solution 0.3-0.6%
   precipitate calcium carbonate 16-18%
   calcium carbonate 16-17.5%
   titanium dioxide 10-20%
   styrenated acrylic resin
   coalescent 2-4%
   fungicide 0.1-0.2%
   bactericide 0.1-0.2%.

* * * * *

UNITED STATES PATENT AND TRADEMARK OFFICE
CERTIFICATE OF CORRECTION

| | |
|---|---|
| PATENT NO. | : 7,611,654 B2 |
| APPLICATION NO. | : 10/891213 |
| DATED | : November 3, 2009 |
| INVENTOR(S) | : Antonio Sergio Moutinho |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1423 days.

Signed and Sealed this

Twelfth Day of October, 2010

David J. Kappos
*Director of the United States Patent and Trademark Office*